United States Patent [19]

Lundgard

[11] Patent Number: 5,507,984
[45] Date of Patent: Apr. 16, 1996

[54] METHOD FOR PREPARING POLY(PHENYLENE SULFIDE) MEMBRANES

[75] Inventor: Richard A. Lundgard, Midland, Mich.

[73] Assignee: The Dow Chemical Company, Midland, Mich.

[21] Appl. No.: 381,796

[22] Filed: Feb. 1, 1995

[51] Int. Cl.$^6$ .......................... B29C 67/20; D01D 5/247
[52] U.S. Cl. .............. 264/41; 264/83; 264/184; 264/203; 264/209.1; 264/211.16; 264/211.19; 264/216; 264/344
[58] Field of Search .................. 264/41, 83, 184, 264/203, 209.1, 211.16, 211.19, 216, 344

[56] References Cited

U.S. PATENT DOCUMENTS

| | | | |
|---|---|---|---|
| 5,043,112 | 8/1991 | Beck | 264/41 |
| 5,246,647 | 9/1993 | Beck et al. | 264/41 |

FOREIGN PATENT DOCUMENTS

| | | |
|---|---|---|
| 0297744 | 1/1989 | European Pat. Off. . |

OTHER PUBLICATIONS

Ma et al., "Rheological and Morphological Properties of Thermal–Aged Poly(phenylene Sulfide) Resin", *J. App. Pol. Sci.*, vol. 39, pp. 1399–1415 (1990).

Smith, "Poly(arylene Sulfides)" *Encyclopedia of Polymer Science and Technology*, vol. 10, 1969, pp. 653–659.

Hawkins, "Chemistry of the Cure of Poly(p–phenylene sulfide", *Macromolecules*, vol. 9, No. 2, Mar.–Apr., 1976, pp. 189–194.

*Encyclopedia of Polymer Science and Engineering*, vol. 16, (1989), pp. 288–290, 359.

Scobbo, "Effect of Solid–State Curing on the Viscoelastic Properties of Poly(phenylene sulfide)" *J. of App. Pol. Sci.*, vol. 47, pp. 2169–2175 (1993).

Meier et al., "Selectivity enhancement via phtooxidative surface modification of polyimide air separation membranes", J. of Membrane Sci., 94 (1994), pp. 195–212.

*Primary Examiner*—Leo B. Tentoni

[57] ABSTRACT

A process is disclosed for preparing a poly(phenylene sulfide) (PPS) separation membrane in which a PPS is treated with oxygen to increase its bulk viscosity to at least about 20,000 poise. The treated PPS is then dissolved in a solvent and cast or extruded, followed by a precipitation step.

23 Claims, No Drawings

METHOD FOR PREPARING POLY(PHENYLENE SULFIDE) MEMBRANES

BACKGROUND OF THE INVENTION

This invention relates to a method for making separation membranes from poly(phenylene sulfide) resins.

Poly(phenylene sulfide) (PPS) polymers are known to have excellent thermal stability and chemical resistance. For these reasons, it has been attempted to make membranes from these polymers.

Membranes are often made by extruding a solution of a polymer in a suitable solvent. With most polymers, this technique is readily applied because the polymers form high viscosity solutions which can be extruded to form membranes having useful properties. However, it has been found to be difficult to prepare membranes in this manner from poly(phenylene sulfide). Unless the polymer concentration is very high, PPS solutions have viscosities so low that they do not maintain their shape as, for example, sheet, tubules or hollow fibers, after they are extruded. These low viscosity solutions are also difficult to feed and convey using the typical screw extrusion equipment since this equipment is designed to use the melt viscosity of the extrudate to provide a pumping action. For these reasons, it is difficult to extrude these solutions into a membrane. As a result, the membrane is either impossible to form, or contains imperfections such as pinholes which destroy the membrane's ability to perform good separations.

By increasing the PPS concentration, the viscosity of PPS solutions can be increased enough to extrude them. However, membranes made from highly concentrated PPS have very low porosity. The fluxes of these membranes are therefore too low to be suitable for commercial use.

It it therefore desirable to provide a method by which poly(phenylene sulfide) polymers can be formed into membranes which are substantially free of imperfections and which exhibit fluxes which are high enough to be useful commercially.

SUMMARY OF THE INVENTION

In one aspect, this invention is a process for preparing a poly(phenylene sulfide) separation membrane, comprising:

(a) treating a poly(phenylene sulfide) polymer with oxygen under conditions sufficient that the poly(phenylene sulfide) polymer attains a viscosity of at least about 20,000 poise, measured as neat polymer at 320° C. by extrusion plastometry at a shear rate of 150 sec$^{-1}$;

(b) dissolving the treated polymer from step (a) in a solvent at an elevated temperature;

(c) casting or extruding the solution from step (b); and (d) precipitating the poly(phenylene) sulfide polymer from the cast or extruded solution to form a membrane.

In another aspect, this invention is a process for preparing a poly(phenylene sulfide) separation membrane, comprising:

(a) heating a poly(phenylene sulfide) polymer to a temperature of at least 200° C., but below the temperature at which the poly(phenylene sulfide) polymer decomposes, in the presence of oxygen for a period of time sufficient that the poly(phenylene sulfide) polymer attains a viscosity of at least about 20,000 poise, measured as neat polymer at 320° C. by extrusion plastometry at a shear rate of 150 sec$^{-1}$;

(b) dissolving the treated polymer from step (a) in a solvent at an elevated temperature;

(c) casting or extruding the solution from step (b); and (d) precipitating the poly(phenylene sulfide) polymer from the cast or extruded solution to form a membrane.

In either aspect of this invention, poly(phenylene sulfide) membranes which are substantially free of defects and which exhibit good fluxes can be economically prepared.

DETAILED DESCRIPTION OF THE INVENTION

In the first step of the process of this invention, a poly(phenylene sulfide) polymer is treated with oxygen under conditions which cause an increase to the solution viscosity of the polymer. The oxygen may be in the form of $O_2$, and may be used as a mixture with other gasses, with air being a preferred oxygen source. The oxygen may also be wholly or partially in the form of ozone. The conditions for treatment are not themselves critical provided that the required increase in solution viscosity is obtained. Among suitable treatment techniques are irradiation in the presence of oxygen ($O_2$) and thermal treatment in the presence of oxygen. Thermal treatment in the presence of oxygen is especially preferred.

Commercial grades of poly(phenylene sulfide) can be used in this invention, provided that they exhibit increased solution viscosity after treatment with oxygen as described herein. Thus, certain thermally treated commercial grades of poly(propylene sulfide), such as RYTON® V-1, P-4 and P-6 poly(phenylene sulfide) resins sold by Phillips Chemical Company, are less preferred because their solution viscosity is inadequate despite this thermal treatment, and further treatment usually does not sufficiently increase the solution viscosity. More linear, higher molecular weight grades of poly(phenylene sulfide) having melt flows (as neat resins) of less than about 150 g/10 min, preferably less than about 100 g/10 min and which exhibit viscosity increases following thermal treatment are therefore preferred. Examples of such PPS resins include the extrusion grades of PPS resins sold by Hoechst Celanese Corporation under the trade name FORTRON®. A particularly preferred resin is FORTRON® polyphenylene sulfide resin, available from Hoechst Celanese Corporation. In general, it is preferred that the PPS is in a finely divided form, so that more uniform treatment of the resin is easily achieved.

The PPS is treated with oxygen under conditions sufficient that the treated PPS exhibits a viscosity as a neat polymer of at least about 20,000 poise, preferably at least about 50,000 poise, more preferably at least about 200,000 poise, most preferably at least 1,000,000 poise. Neat polymer viscosities reported herein are measured at 320° C. on an Instron Capillary Rheometer using a capillary die which is 1 inch long and having a hole diameter of 0.05 inch. The sample is permitted to melt for 10 minutes at 320° C. before beginning the test. The crosshead speed is such that the shear rate is 150 sec$^{-1}$.

Treatment with irradiation can be done with any radiation source which provides activation energy sufficient to permit oxygen to react with the PPS. Suitable radiation sources include ultraviolet, electron beam and gamma radiation.

The most preferred method is to heat treat the PPS in the presence of oxygen. The heat treating is advantageously done at a temperature in excess of 200° C. but below a temperature at which measurable degradation of the PPS occurs. It is preferred that the temperature is no more than slightly (10° C.) above the crystalline melting point of the PPS. It is preferred to treat the PPS in the solid state, because the surface area of the solid particles is greater than that of the molten polymer. Preferably, the temperature is from about 240° C., more preferably about 260, up to about 340° C., more preferably up to about 320° C., most preferably up to about 300° C. The heating is conducted in the presence of oxygen, at a partial pressure of from 1 Torr up to atmospheric pressure or above. Mixtures of oxygen and other gases, such as oxygen/nitrogen mixtures, can be used. It is most preferred from an economic standpoint to use air.

The heating is conducted for a time sufficient to increase the solution viscosity as described above. Although the time required depends somewhat on the temperature used and the partial pressure of oxygen, in general a heating time of about 5 minutes to about 6 hours, preferably about 10 minutes to about 5 hours, is sufficient. The time required also depends on the size of the PPS particles and the manner of heating. Larger particles require longer heating times, so it is preferred to use a finely particulate resin in order to minimize the time and expense of heat treatment. Heating the PPS resin using a fluidized bed or similar technique which provides for efficient heat transfer and oxygen contact to the resin particles can greatly reduce the needed treatment time, and is therefore preferred.

It has been found that as heat treating continues, the solution viscosity of the resin reaches a point at which it remains more or less constant. After this point, continued heating increases the gel content (i.e., the proportion of insoluble crosslinked material) but does not result in a further significant increase in solution viscosity. Since it is difficult or impossible to process the insoluble gels into a membrane, the gelled material is largely wasted. For this reason, it is preferred to terminate the heat treatment while the gel content is below 50% by weight, preferably below about 30% by weight of the PPS. For the purposes of this invention, gel content is measured according to ASTM D-2765 (Test Method A) with the following modifications. The sample is contained in a pouch made from 400×400 mesh 304 stainless steel mesh (McMaster-Carr No. 9236T28, wire diameter 0.0010 inch, mesh opening width 0.0015 inches, open area 36%)(instead of the less stringent 120 size mesh specified by the ASTM test). The solvent is diphenyl terephthalate, and the extraction is carried out at 260° C. for 2 hours. After the extraction, the sample is leached in methylene chloride for several hours, dried and the gel fraction calculated from the amount of polymer remaining in the pouch.

The treated resin is then dissolved into a solvent in order to prepare the membrane. The solvent is any which (a) dissolves at least 10% by weight of the treated PPS, (b) is stable (i.e. does not significantly degrade or react with the PPS) and (c) does not boil at the temperature required to dissolve the PPS resin and to prepare a membrane therefrom. The solvent does not have to be a liquid at room temperature. Suitable such solvents are described in U.S. Pat. No. 5,043,112 to Beck, issued Aug. 27, 1991, and U.S. Pat. No. 5,246,647 to Beck et al., issued Sep. 21, 1993, incorporated herein by reference. Preferred solvents include m-terphenyl, o-terphenyl, p-terphenyl, mixtures of o-, m- and p-terphenyls, such as sold under the trade name Santowax®; hydrogenated and partially hydrogenated terphenyls, such as sold by Monsanto Chemical Company under the trade designation HB-40; phenanthrene, 1,2,3- and 1,3,5-triphenylbenzene, diphenyl sulfone, diphenyl phthalate, epsilon-caprolactam, N-cyclohexyl-2-pyrrolidone, diphennyl isophthalate, diphenyl terephthalate, mixtures thereof and the like.

Methods of forming a solution of PPS in a solvent and extruding a membrane therefrom are described in U.S. Pat. No. 5,246,647, and those methods are suitable for use in this invention. In general, the solvent and the treated PPS are blended and heated to a temperature sufficient to melt both of them. The required temperature in any given case depends on the particular solvent used, but in general, a temperature of about 150° to about 340° C. is sufficient. Agitation may be and preferably is used to facilitate dissolution of the PPS.

The relative proportions of PPS and solvent used are selected to provide a solution having a workable viscosity and from which the polymer can be precipitated to form a porous membrane.

Solution viscosity increases with increasing polymer concentration. It is normally desirable to provide a solution which, at the temperature of extrusion, has a viscosity of at least about 100 poise, preferably at least about 200 poise, more preferably at least about 400 poise. At lower viscosities, the solution usually does not maintain its shape after extrusion and is difficult to process through an extruder. For making hollow fiber membranes, it is especially preferred that the solution has a viscosity at the temperature of extrusion of at least about 300 poise, preferably at least about 400 poise, more preferably at least about 800 poise. On the other hand, very viscous solutions require excessive energy to extrude, making the process less efficient. Therefore, it is preferred that the solution has a viscosity of less than about 5000 poise.

Suitable solution viscosities are generally obtained when the solution contains from about 5, preferably from about 10, more preferably from about 15 weight percent, up to about 60, preferably up to about 50, more preferably up to about 40 weight percent PPS, based on the total weight of the solvent and PPS. Solutions containing these amounts of PPS can also be precipitated to provide a membrane exhibiting good flux values.

The resulting solution may be immediately cast or extruded, or stored until a later time.

If desired, the PPS solution may contain additional components such as antioxidants, plasticizers, pore forming agents, diluents, stabilizers and the like. It is also within the scope of this invention to employ one or more additional polymers in the PPS solution, if desired to form a membrane having particular properties. Membranes from from blends of PPS and another polymer are described, for example, in copending U.S. patent application Ser. Nos. 12,584, now abandoned, filed Feb. 3, 1993 and 12,872, filed Feb. 3, 1993.

The PPS solution may also contain a pore forming component. Such a pore forming component is advantageously a material which is miscible with the solvent, is a nonsolvent for the PPS, boils at a temperature above about 280° C., and does not undesirably react with the PPS and the solvent. The use of such a pore forming component is described in U.S. Pat. No. 5,246,647. Preferred pore forming components include, for example, tetra-phenylsilane, diphenyl sulfoxide, diphenic acid, 4-acetylbiphenyl, bibenzyl, diphenyl methyl ketone, mineral oil, butyl stearate, phenyl benzoate, 1-phenyldecane, 1,3-diphenoxybenzene, 1,8-dichloroanthraquinone, polyphosphoric acid, dioctyl phthalate, 5-chlorobenzoxazolone, bis-(-4-chlorophenyl sulfone), diphenyl chlorophosphate, sulfolane, methyl myristate, methyl stearate, hexadecane, dimethyl phthalate, tetraethylene glycol dimethyl ether, diethylene glycol dibutyl ether, docosane, dotriacontane, tetraphenylene, pentafluorophenol, paraffin oil, 1-methyl-2-pyrrolidinone, 4,4'-dihydroxybenzophenone, or mixtures thereof.

If a membrane is to be cast from the PPS solution, any suitable technique can be used, including those described in U.S. Pat. No. 5,246,647, incorporated herein by reference.

Preferably, the PPS solution is extruded. Extrusion may be performed in any convenient manner. The solution is heated to a temperature sufficient to form a melt having a viscosity in the ranges described above, and extruded though a suitable die. The die is advantageously a slit die, which extrudes a thin film of the solution for making a sheet membrane, or a spinneret suitable for preparing hollow fiber membranes.

When a slit die is used, the solution may be extruded onto a rolling drum, a belt, or other means for supporting the extrudate so it maintains its shape and integrity until the phase inversion step is complete.

When a slit die is used, it is preferred that the die produce an extrudate having a thickness of about 1 to about 100 microns, preferably about 2 to about 50 microns, more preferably about 2 to about 20 microns.

The extrusion conditions may be manipulated in order to adjust the pore size of the membrane. For example, when the membrane is cast onto a rolling drum or a belt, the linear speed of the drum or belt may be increased or decreased relative to the linear rate of extrusion. The rate of cooling the extrudate also affects pore size, with faster cooling tending to favor the formation of smaller pores. A convenient way of controlling the cooling rate is by heating or cooling the drum or belt on which the PPS is extruded. The drum or belt may be maintained at a temperature from about −80° C. to about the melting point of the PPS solution, preferably from about 25° to about 260° C.

In making a hollow fiber membrane, the solution is extruded through a spinneret including a means for supplying a fluid to the core of the fiber to prevent it from collapsing upon itself. Suitable fluids include gasses such as air, nitrogen, carbon dioxide and the like as well as liquids which do not boil at the temperatures of extrusion and which do not react with the PPS solution in any adverse manner. The liquid is preferably not a solvent for the PPS. Such liquids include dioctyl phthalate, methyl stearate, polyglycols, mineral oil, paraffin oil, petroleum oil, heat transfer fluids and silicone oils.

The outside diameter of a hollow fiber membrane made according to this invention may vary depending on the separations for which it is intended, and the conditions, including pressures, under which it will operate. In general, however, the size of the hollow fiber is not critical to this invention. Outer diameters of hollow fiber membranes made according to this invention advantageously range from about 5 to about 3,000, preferably about 50 to about 2,000 microns, with wall thicknesses advantageously in the range from about 5 to about 500 microns, preferably about 20 to about 400 microns.

After the polymer solution is extruded, a precipitation of the PPS from the solution is effected. This precipitation is conducted in such a way that a continuous polymer phase is formed in the desired shape. Within the continuous polymer phase is formed a continuous solvent phase which, when leached out, forms pores or channels through the resulting membrane, thereby imparting flux to the membrane. This precipitation step is conveniently conducted simply by permitting the extruded solution to cool. As the solution cools, it normally forms a phase rich in polymer and a phase which is lean in polymer. As the polymer-rich phase cools, the polymer molecules form a continuous phase which incorporates the solvent as a separate continuous phase. The polymer-lean phase is advantageously removed from the membrane.

The solvent droplets formed in the precipitation step are advantageously leached out with a leaching agent which dissolves the solvent used in making the membrane but does not dissolve the PPS. Suitable leaching agents include toluene, xylene, acetone, methyl ethyl ketone, N-methyl pyrrolidone, chlorinated hydrocarbons such as methylene chloride, carbon tetrachloride, trichloroethylene and 1,1,1-trichloroethane. Suitable leaching conditions include a temperature from about 0° C. to about 200° C. for a period of a few minutes up to several hours. In this way, pores are formed in the membrane which correspond in size and shape to the solvent droplets. The number and size of the pores determine the porosity of the membrane. The membrane advantageously has a void volume of from about 20, preferably from about 30% by volume, up to about 90, more preferably up to about 80% by volume. The pore size can be estimated by several techniques, including a bubble point test as described in ASTM F316-86. The average pore size is preferably between about $1\times10^{-3}$ microns to about 5 microns, more preferably between about $3\times10^{-3}$ microns to about 1 micron in diameter.

The leaching solvent may be exchanged with a drying solvent. The drying solvent permits the removal of the leaching solvent without causing the membrane to collapse. Suitable drying solvents include ethanol, isopropanol, methanol, lower hydrocarbons such as octane, hexane and cyclohexane, mixtures thereof, and the like.

Following leaching, the membrane may be dried if desired to remove the leaching agent or drying agent. Drying can be accomplished by heating below the glass transition temperature of the PPS, or by treating the membrane with a chemical drying agent.

The membrane may be drawn down or stretched if desired in order to adjust its size to a desired thickness, to induce axial orientation and/or manipulate pore size. The conditions for draw down or stretching are not critical provided that the membrane maintains its integrity. Suitable such conditions are described in U.S. Pat. No. 5,246,647, incorporated herein by reference. Draw down or stretching may be performed before, during or after leaching.

Because of their porosity, membranes prepared in accordance with this invention are useful for a variety of ultra-filtration and microfiltration applications, such as filtering from liquids and gasses solid and colloidal particles having diameters in the range from about 0.005 microns to about 5 microns, preferably about 0.07 to about 1 micron. Examples of such filtrations applications include removal of pigments from liquids, filtration of smoke particles from gasses, removal of dust particles from gasses, filtration of bacterial and/or viruses from liquids and gases, and other filtration applications. Because the PPS has excellent temperature stability and solvent resistance, the membranes of this invention is particularly suitable in high temperature applications and in applications involving exposure of the membrane to organic solvents. The membrane is also useful in non-filtration applications such as breathable fabrics, porous catalyst supports, membrane reactors, membrane contactors and bioreactors.

The membrane made in accordance with this invention can be used in any convenient manner. In general, the fluid being filtered is applied to one side of the membrane, and a permeate withdrawn from the opposing side, with a pressure drop occurring across the membrane.

The following examples are provided to illustrate the invention but are not intended to limit the scope thereof. All parts and percentages are by weight unless otherwise indicated.

EXAMPLE 1

A commercial grade particulate PPS resin (FORTRON® 300 BO (polyphenylene sulfide resin, from Hoescht-Celanese) is heated for three hours in air at 280° C. in an air circulating oven. The treated PPS exhibits a solution viscosity in excess of 300 poise.

Portions of the treated resin are then dissolved in various solvents by heating a mixture of the treated resin and the solvent to about 300° C. with stirring until a clear solution is obtained. The resulting solutions (Sample Nos. 1–5, respectively) are then cooled to allow them to solidify, and granulated. The solvents and proportions of treated PPS and solvent are as described in Table 1 following.

A membrane is made from Sample No. 1 by extruding it at a temperature of 277° C. through a film die onto a heated godet roll stack. The die gap is 12 mils, the die width is six inches and the linear extrusion rate is 146 cm/min. The godet temperature is 160° C. and its speed is 146 cm/min. The air gap between the godet and the die is 1 cm.

Sample No. 2 is extruded into a membrane at a temperature of 279° C. through a film die onto a godet roll stack which is heated at 130° C. The die gap is 12 mils, the die width is two inches and both the linear extrusion rate and the godet speed are 171 cm/min. The air gap between the godet and the die is 1 cm.

Sample No. 3 is extruded into a membrane at a temperature of 270° C. through a film die onto a godet roll stack which is heated at 160° C. The die gap is 12 mils, the die width is six inches and both the linear extrusion rate and the godet speed are 137 cm/min. The air gap between the godet and the die is 1 cm.

Sample No. 4 is extruded into a membrane at a temperature of 275° C. through a film die onto a godet roll stack which is heated at 160° C. The die gap is 12 mils, the die width is six inches and both the linear extrusion rate and the godet speed are 146 cm/min. The air gap between the godet and the die is 1 cm.

Sample No. 5 is extruded at a temperature of 280° C. through a film die onto a heated godet roll stack. The die gap is 12 mils, the die width is 10 inches, and the linear extrusion rate is 97 cm/min. The godet temperature is 180° C. and its speed is 91 cm/min. The air gap between the godet and the die is 0.5 cm.

After extrusion of Sample Nos. 1–5, the PPS rapidly phase separates to form a PPS polymer film. The film is cooled and leached for four hours with methylene chloride. The leached films are then wetted with isopropanol in order to exchange the methylene chloride for isopropanol, and then are air dried.

The resulting membranes are then tested for nitrogen flux, water flux, maximum pore size and, in some instances, mean size. The results are as reported in Table 1. These tests are done on disc samples mounted in a model UHP-25 membrane holder sold by MFS, Dublin, Calif. Water flux tests are done at 20–40 psi, with the results normalized for active membrane area and pressure. Feed water for the water flux tests is HPCL grade.

Maximum pore size is determined by the bubble point method of ASTM F-316-86, modified as follows to accommodate the membrane holder. The membrane is held in the membrane holder and wetted with ethanol. The bubble point is determined by connecting a pipette to the cell output and watching for bubbles from the pipette tip submerged in a beaker of water as the nitrogen pressure is increased. Maximum pore size is determined in this manner, mean pore size is determined per ASTM—F-316-86, except that the sample is held in the membrane holder model UHP-25 as previously described.

TABLE 1

| Property | Sample No. | | | | |
| --- | --- | --- | --- | --- | --- |
| | 1 | 2 | 3 | 4 | 5 |
| PPS Conc., %[1] | 38 | 38 | 35 | 35 | 35 |
| Solvent[2] | A | B | B | C | D |
| Viscosity of the PPS solution, poise/ Shear rate, sec$^{-1}$ | 733/124 | 2133/43 | 487/224 | 330/270 | N/D |
| Nitrogen Flux (cc/cm$^2$/sec/cmHg) | 0.0070 | 0.020 | 0.029 | 0.030 | 0.014 |
| Membrane Water Flux (L/M$^2$/Hr/Bar) | 60 | 109 | 218 | 216 | 67 |
| Maximum Pore Size, Membrane (μm) | 0.55 | 0.18 | 0.16 | 0.16 | 0.06 |
| Mean Pore Size, Membrane (μm) | ND | ND | .06 | ND | ND |

[1] Concentration of poly(phenylene sulfide) in the extruded solution, in weight percent.
[2] A--m-terphenyl; B--diphenyl isophthalate; C 32.5/32.5 blend of diphenyl isophthalate and m-terphenyl; D--50/15 blend of diphenyl isophthalate and a hydrogenated terphenyl sold by Monsanto Chemicals as HB-40.
ND means not determined.

As can be seen from the data in Table 1, membranes having useful filtration properties can be prepared in accordance with this invention using a variety of solvents.

EXAMPLE 2

A portion of the heat treated PPS from example 1 is dissolved in diphenyl isophthalate to form a solution containing 32% by weight PPS. The resulting solution is then separated into Sample Nos. 6 and 7.

Sample No. 6 is extruded at a temperature of 275° C. through a film die onto a heated godet roll stack. The die gap is 12 mils, the die width is 6 inches, and the linear extrusion rate is 174 cm/min. The godet temperature is 102° C. and its speed is 149 cm/min. The air gap between the godet and the die is 0.5 cm.

Sample No. 7 is extruded at a temperature of 273° C. through a film die onto a heated godet roll stack. The die gap is 12 mils, the die width is 6 inches, and the linear extrusion rate is 189 cm/min. The godet temperature is 200° C. and its speed is 149 cm/min. The air gap between the godet and the die is 0.5 cm.

Following extrusion, Samples Nos. 6 and 7 are cooled, leached, wetted and dried as described in Example 1. In both cases, the extrudate is visually observed as it contacts the godet to determine the length of time before it becomes opaque, indicating that precipitation of the PPS has begun. The water flux and maximum pore size of the resulting membranes are measured and are as reported in Table 2.

TABLE 2

| Sample No. | Godet Temp. °C. | Time to Phase Inversion, s[1] | Water Flux (L/M².Hr. Bar) | Maximum Pore Size (μm) | Mean Pore Size (μm) |
| --- | --- | --- | --- | --- | --- |
| 6 | 102 | 0.2 | 118 | 0.08 | 0.04 |
| 7 | 200 | 6 | 409 | 0.20 | 0.10 |

[1]The time required for the extrudate to become opaque after contacting the godet roll.

The data in Table 2 demonstrates that the pore size and flux properties of the PPS membranes may be affected by controlling extrusion variables such as godet temperature. Pore size may also be increased or decreased by other techniques, such as by blowing air or nitrogen across the surface of the hot extrudate, contacting the extrudate with a liquid or gaseous coolant, and the like.

EXAMPLE 3

A portion of FORTRON® 300 BO PPS resin is heated in air for 6 hours at 280° C. in an air circulating oven. The solution viscosity of the resulting heat treated PPS is found to be 818 poise at a shear rate of 139 sec$^{-1}$. At a shear rate of 100 sec$^{-1}$, the viscosity would be even higher. A solution of 40 weight percent of the heat treated resin and 60% DPIP is prepared by melting PPS and solvent together with mixing at 320° C. The resulting solution is solidified by cooling and granulated. The granulated solution is loaded into a ram extruder equipped with a hollow fiber spinneret and extruded at 280° C. Nitrogen is fed to the fiber lumen as a core gas. The resulting fiber is cooled, taken up on a room temperature godet roll, extracted with methyl ethyl ketone to remove the solvent, and air dried. The resulting hollow fiber membrane has a nitrogen flux of 1.76×10–2 cm$^3$/cm$^2$/sec/cmHg, a maximum pore size of 0.15 μm, and a water flux of 100 L/M$^2$/Hr/Bar. The fiber dimensions are approximately 370 μm on the inside and 600 μm on the outside.

What is claimed is:

1. A process for preparing a poly(phenylene sulfide) separation membrane, comprising:

(a) treating a poly(phenylene sulfide) polymer with oxygen under conditions sufficient that the poly(phenylene sulfide) polymer attains a viscosity of at least about 20,000 poise, measured as neat polymer at 320° C. by extrusion plastometry at a shear rate of 150 sec$^{-1}$;

(b) dissolving the treated polymer from step (a) in a solvent at an elevated temperature;

(c) casting or extruding the solution from step (b); and (d) precipitating the poly(phenylene) sulfide polymer from the cast or extruded solution to form a membrane.

2. The process of claim 1, further comprising (e) leaching the precipitated poly(phenylene sulfide) polymer to remove residual solvent.

3. The process of claim 1, wherein the solution from step (b) is extruded.

4. The process of claim 3, wherein a hollow fiber membrane is formed.

5. The process of claim 3, wherein a flat sheet membrane is formed.

6. The process of claim 5, wherein said solution from step (b) is extruded onto a support.

7. The process of claim 1, wherein the solvent is m-terphenyl, o-terphenyl, p-terphenyl, a mixture of o-, m- and p-terphenyl, a hydrogenated or partially hydrogenated terphenyl, phenanthrene, 1,2,3- and 1,3,5-triphenylbenzene, diphenyl sulfone, diphenyl phthalate, epsilon-caprolactam, N-cyclohexyl-2-pyrrolidone, diphennyl isophthalate, diphenyl terephthalate or a mixture thereof.

8. The process of claim 1 wherein said poly(phenylene sulfide) polymer formed in step (a) exhibits a viscosity of at least about 100,000 poise.

9. The process of claim 7 wherein said poly(phenylene sulfide) polymer formed in step (a) has a gel content of 30% by weight or less.

10. The process of claim 1 wherein in step (b), the treated polymer is dissolved in a solvent in the presence of a pore forming component.

11. A process for preparing a poly(phenylene sulfide) separation membrane, comprising (a) heating a poly(phenylene sulfide) polymer to a temperature of at least 200° C., but below the temperature at which the poly(phenylene sulfide) polymer decomposes, in the presence of oxygen for a period of time sufficient that the poly(phenylene sulfide) polymer attains a viscosity of at least about 20,000 poise, measured as neat polymer at 320° C. by extrusion plastometry at a shear rate of 150 sec$^{-1}$;

(b) dissolving the treated polymer from step (a) in a solvent at an elevated temperature;

(c) casting or extruding the solution from step (b); and (d) precipitating the poly(phenylene)sulfide polymer from the cast or extruded solution to form a membrane.

12. The process of claim 11, further comprising (e) leaching the precipitated poly(phenylene sulfide) polymer to remove residual solvent.

13. The process of claim 11, wherein the solution from step (b) is extruded.

14. The process of claim 13, wherein a hollow fiber membrane is formed.

15. The process of claim 13, wherein a flat sheet membrane is formed.

16. The process of claim 15, wherein said solution from step (b) is extruded onto a support.

17. The process of claim 11 wherein the solvent is m-terphenyl, o-terphenyl, p-terphenyl, a mixture of o-, m- and p-terphenyl, a hydrogenated or partially hydrogenated terphenyl, phenanthrene, 1,2,3- and 1,3,5-triphenylbenzene, diphenyl sulfone, diphenyl phthalate, epsilon-caprolactam, N-cyclohexyl-2-pyrrolidone, diphennyl isophthalate, diphenyl terephthalate or a mixture thereof.

18. The process of claim 11 wherein said poly(phenylene sulfide) polymer treated in step (a) attained a viscosity of at least about 200,000 poise.

19. The process of claim 18 wherein said poly(phenylene sulfide) polymer formed in step (a) has a gel content of 30% by weight or less.

20. The process of claim 11 wherein in step (b), the treated polymer is dissolved in a solvent in the presence of a pore forming component.

21. A process for preparing a poly(phenylene sulfide) membrane, comprising (a) dissolving a poly(phenylene sulfide) polymer in a solvent at an elevated temperature, wherein said poly(phenylene sulfide) polymer exhibits a viscosity of at least about 20,000 poise, measured as neat polymer at 320° C. by extrusion plastometry at a shear rate of 150 sec$^{-1}$;

(b) casting or extruding the solution from step (a); and (c) precipitating the poly(phenylene) sulfide polymer from the cast or extruded solution to form a membrane.

22. The Process of claim 1, wherein a hollow fiber or flat sheet membrane is formed.

23. The process of claim 11, wherein a hollow fiber or flat sheet membrane is formed.

\* \* \* \* \*